United States Patent
Marzban et al.

(10) Patent No.: US 12,191,938 B2
(45) Date of Patent: Jan. 7, 2025

(54) CHANNEL ESTIMATE OR INTERFERENCE REPORTING IN A WIRELESS COMMUNICATIONS NETWORK

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Taesang Yoo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/655,165

(22) Filed: Mar. 16, 2022

(65) Prior Publication Data

US 2023/0299815 A1 Sep. 21, 2023

(51) Int. Cl.
*H04B 7/0417* (2017.01)
*H04B 7/0408* (2017.01)
*H04B 7/06* (2006.01)

(52) U.S. Cl.
CPC ......... *H04B 7/0417* (2013.01); *H04B 7/0408* (2013.01); *H04B 7/0632* (2013.01); *H04B 7/0639* (2013.01)

(58) Field of Classification Search
None
See application file for complete search history.

(56) References Cited

U.S. PATENT DOCUMENTS

| | | | |
|---|---|---|---|
| 2020/0259575 A1* | 8/2020 | Bai | H04B 7/088 |
| 2021/0211912 A1 | 7/2021 | Zeng et al. | |
| 2021/0226674 A1 | 7/2021 | Ramireddy et al. | |
| 2022/0029676 A1* | 1/2022 | Ramireddy | H04B 7/0626 |
| 2022/0131588 A1* | 4/2022 | Elshafie | H04B 7/0626 |
| 2022/0225127 A1* | 7/2022 | Imran | H04B 17/309 |
| 2022/0338189 A1* | 10/2022 | Madadi | H04B 7/0632 |
| 2023/0370181 A1* | 11/2023 | Rydén | G06N 7/01 |
| 2023/0388817 A1* | 11/2023 | Rydén | H04W 24/02 |

FOREIGN PATENT DOCUMENTS

| | | | | |
|---|---|---|---|---|
| EP | 2498419 A2 * | 9/2012 | | H04B 7/2656 |
| WO | WO-2020213964 A1 * | 10/2020 | | H04B 17/327 |
| WO | 2021018221 A1 | 2/2021 | | |

OTHER PUBLICATIONS

International Search Report and Written Opinion—PCT/US2023/063603—ISA/EPO—Jun. 9, 2023.

* cited by examiner

*Primary Examiner* — Anh Vu H Ly
(74) *Attorney, Agent, or Firm* — Patterson + Sheridan, LLP

(57) ABSTRACT

Certain aspects of the present disclosure provide techniques for wireless communications by a user equipment (UE), including receiving, from a network entity, an indication to report at least one of a channel quality indicator (CQI) or a pre-coding matrix indicator (PMI) for one or more future communications resources and sending, to the network entity, a channel state feedback (CSF) report indicating at least one of a predicted CQI or a predicted PMI for the one or more future communications resources prior to the one or more future communications resources occurring in time.

30 Claims, 11 Drawing Sheets

CHANNEL ESTIMATE OR INTERFERENCE REPORTING IN A WIRELESS COMMUNICATIONS NETWORK

BACKGROUND

Field of the Disclosure

Aspects of the present disclosure relate to wireless communications, and more particularly, to techniques for channel estimate or interference reporting.

Description of Related Art

Wireless communications systems are widely deployed to provide various telecommunications services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE), including receiving, from a network entity, an indication to report at least one of a channel quality indicator (CQI) or a pre-coding matrix indicator (PMI) for one or more future communications resources and sending, to the network entity, a channel state feedback (CSF) report indicating at least one of a predicted CQI or a predicted PMI for the one or more future communications resources prior to the one or more future communications resources occurring in time.

One aspect provides a method for wireless communications by a network entity, including transmitting, to a UE, an indication to report at least one of a CQI or a PMI for one or more future communications resources and receiving, from the UE, a CSF report indicating at least one of a predicted CQI or a predicted PMI for the one or more future communications resources prior to the one or more future communications resources occurring in time.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
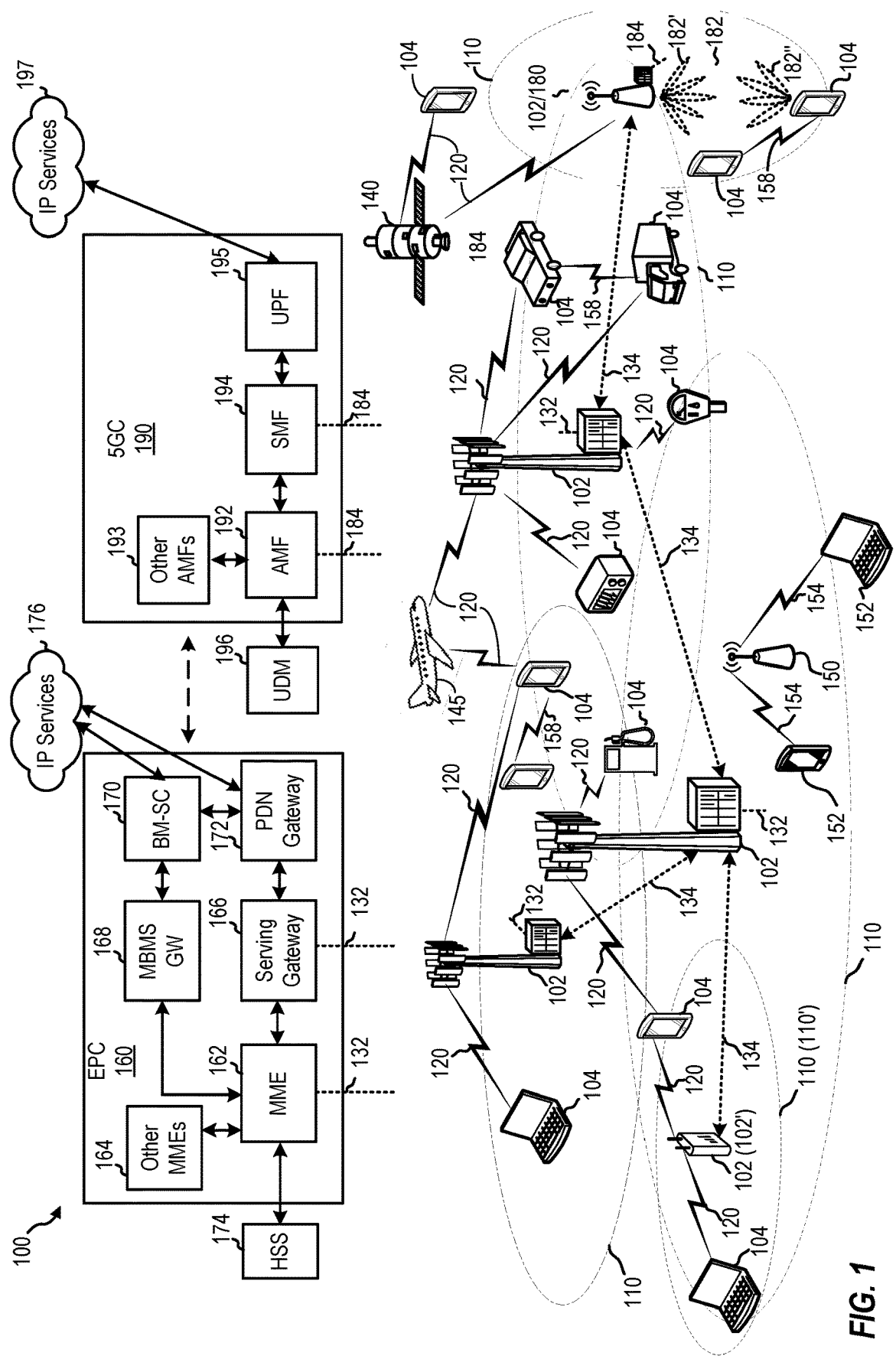
FIG. 1 depicts an example wireless communications network.

Aspects of the present disclosure provide apparatuses, methods, processing systems, and computer-readable mediums for channel estimate and/or interference reporting (e.g., channel state feedback (CSF) reporting) for one or more future communications resources (e.g., time, frequency, and/or spatial resources) in a wireless communications network. For example, certain aspects relate to a network entity configuring a user equipment (UE) to report predicted interference level and/or predicted channel estimation metrics (e.g., a channel quality indicator (CQI) and/or a pre-coding matrix indicator (PMI)), which may be an indication of link quality. Additionally, certain aspects relate to a UE reporting predicted interference level and/or predicted channel estimation metrics to the network entity. In certain aspects, reference to performing interference prediction herein (e.g., including soft interference prediction) can refer to performing interference prediction alone, or can refer to performing interference plus noise prediction. For example, in some cases, the prediction of interference, due to the difficulty of distinguishing between interference alone and noise, may be more accurately described as a prediction of the amount of interference and noise. Accordingly, in certain aspects, reference to a predicted interference herein can refer to predicted interference alone, or can refer to predicted interference plus noise.

In some wireless communications systems, such as 5G NR based systems, a network entity transmits a signal on a communications resource. A UE measures the signal received on the communications resource to determine one or more metrics indicative of link quality between the UE and the network entity on the communications resource. The one or more metrics may include an actual interference observed (e.g., measured) by the UE on the communications resource and/or an actual channel estimate of a communications channel between the UE and the network entity on the communications resource. In certain aspects, the communications resource is referred to as an interference measurement resource (IMR), which is a set of time and frequency resources, referred to as resource elements (REs), that are allocated for measuring interference. In certain aspects, the signal is a reference signal (RS), such as a channel state information reference signal (CSI-RS). In certain aspects, the UE reports the measured interference and/or channel estimate to the network entity as one or more metrics, such as a rank indicator (RI), channel quality indicator (CQI), or precoding matrix indicator (PMI). In certain aspects, the report is a CSF report.

However, interference and channel estimates between the UE and the network entity for a communications resource change over time, such as due to changes in channel conditions, movement of the UE, etc. Therefore, if the time between when the UE measures and sends a CSF report for a communications resource and when the UE is scheduled to communicate with the network entity is large, the CSF report may become outdated.

Accordingly, certain aspects herein provide for channel estimate and/or interference reporting for future communications resources before such communications resources actually occur in time. For example, the UE may utilize algorithms or models, such as artificial intelligence (AI) based or machine learning (ML) based models for predicting interference level and/or channel estimation for future communications resources. As an example, the model may be configured to take as input, parameters defining a future communications resource, such as parameters defining a timing (e.g., symbol index, slot index, etc.) of the communications resource, a frequency (e.g., subcarrier index, resource block (RB) index, etc.) of the communications resource, and/or a spatial property (e.g., spatial layer index) of the communications resource. The model may be configured to output a predicted interference for the future communications resource based on the input parameters. The model may be a supervised learning model trained on previous communications resources, each labeled based on an actual interference measured for the communications resource.

In particular, certain aspects extend reporting frameworks (e.g., a CSF reporting framework) to allow the network entity to configure the UE to report predicted interference level and/or predicted channel estimation metrics for future communications resources before the future communications resources actually occur in time. Further, the UE can then report such predicted interference level and/or predicted channel estimation metrics for future communications resources. Advantageously, such enhanced reporting, allows more accurate assumptions of link quality for communications resources. For example, the network entity can make better scheduling decisions about which communications resources to schedule the UE for communications, and which communications resources to avoid. Overall, this leads to a higher likelihood that the signals on such scheduled communications resources are communicated successfully and decoded properly.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
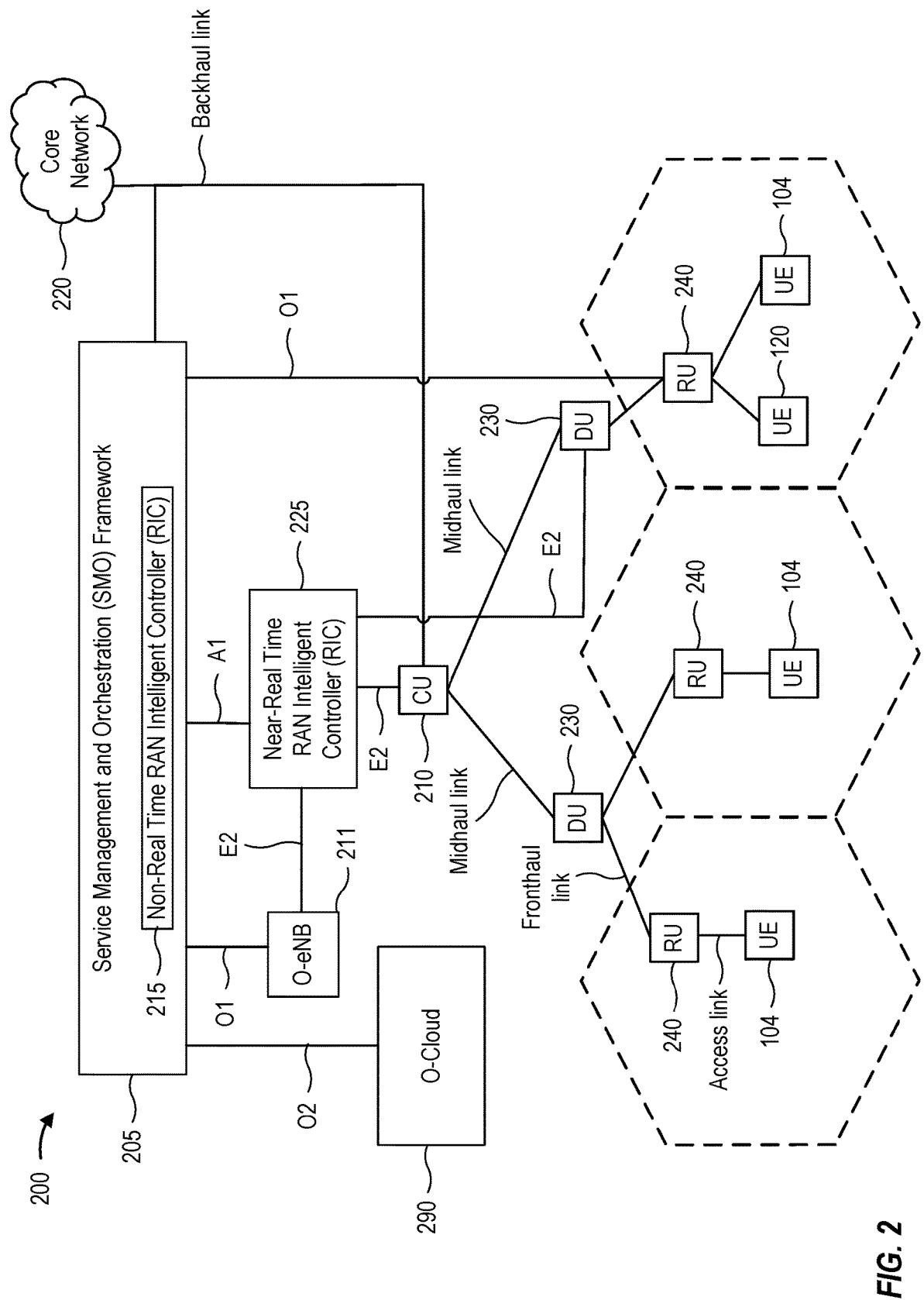
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
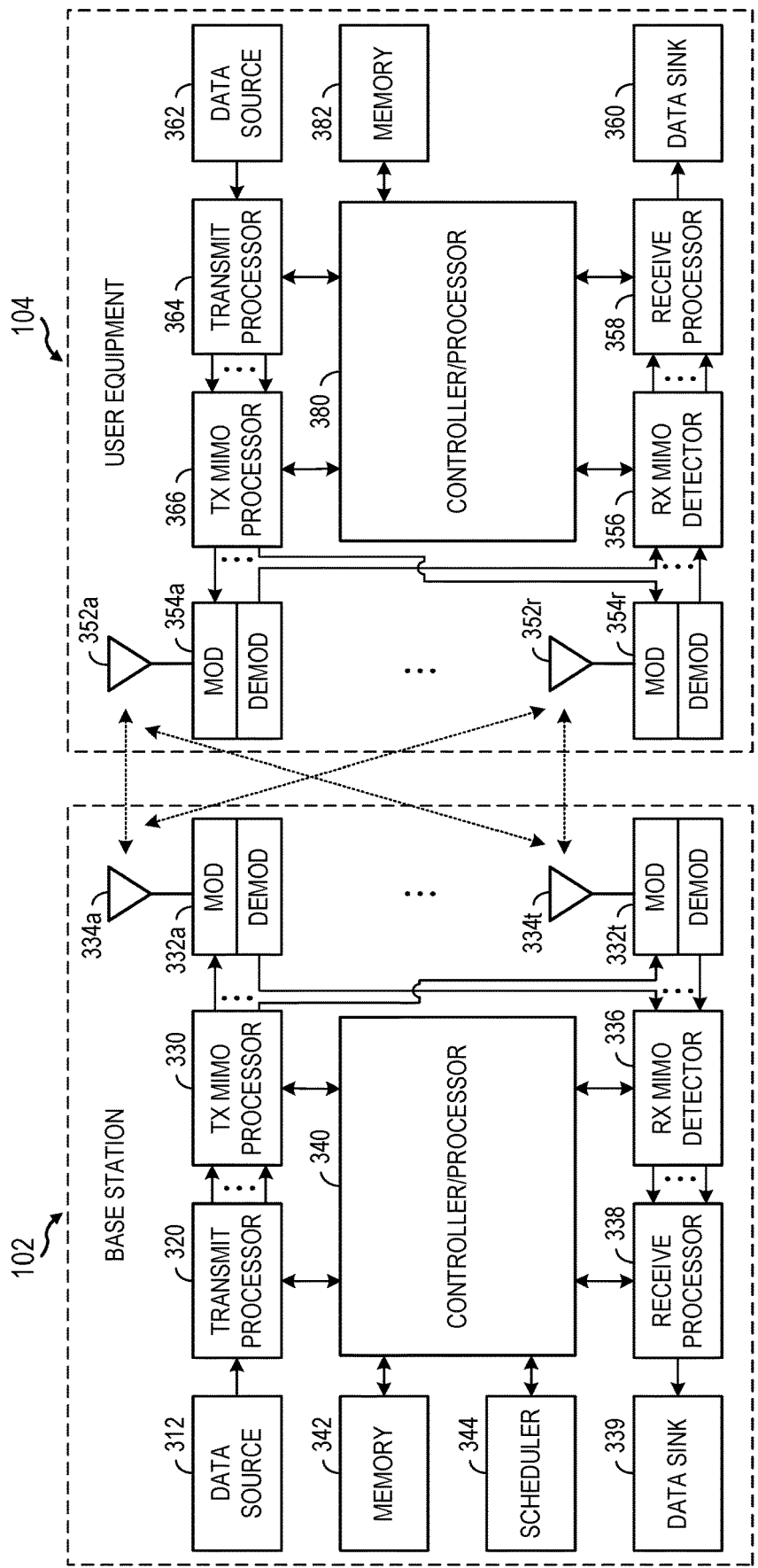
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
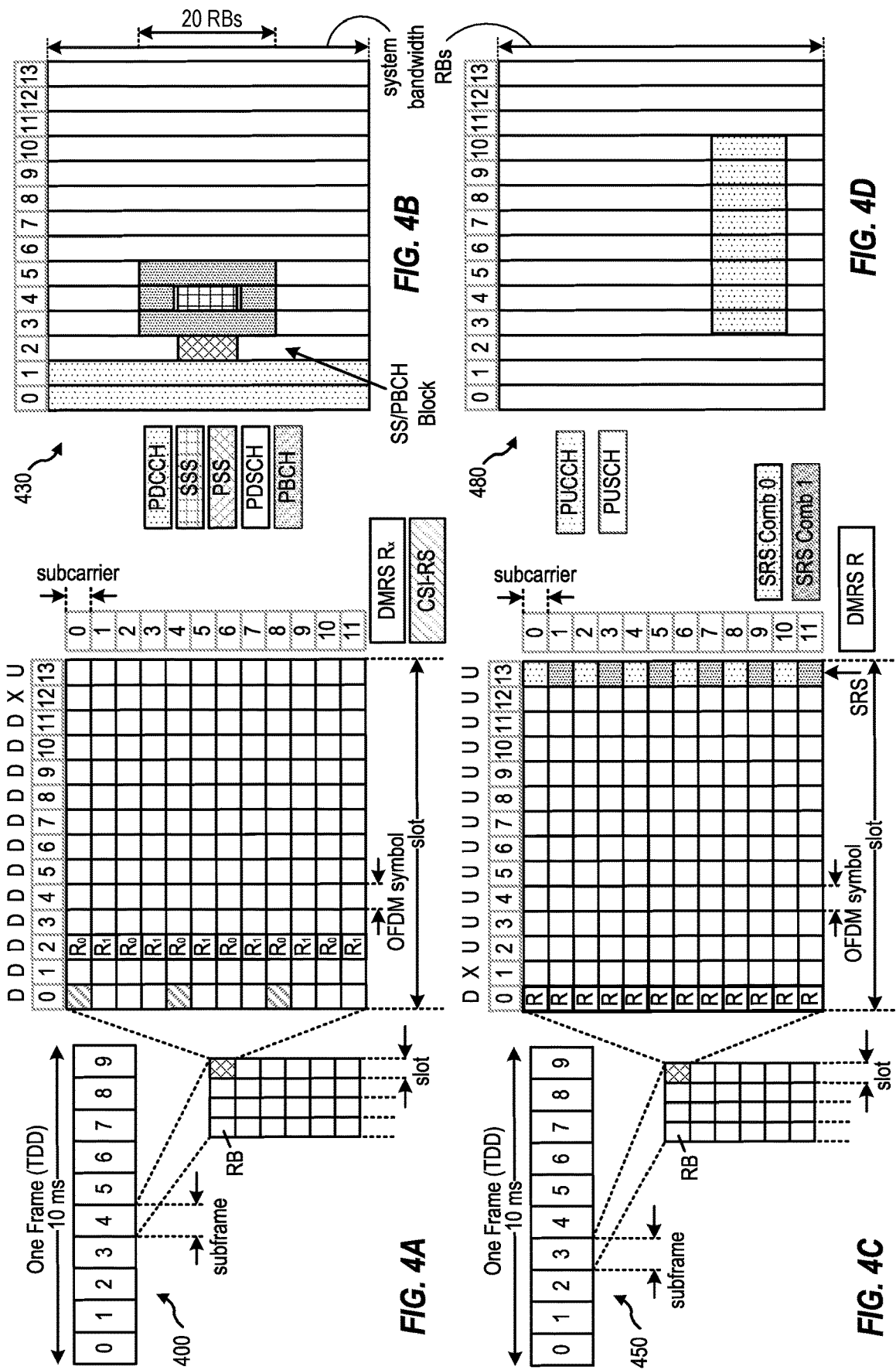
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^{\mu} \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Channel Estimate or Interference Reporting in a Wireless Communications Network As discussed, certain aspects herein provide for channel estimate and/or interference reporting for future communications resources before such communications resources actually occur in time. For example, a UE (e.g., UE 104) may send to a network entity a CSF report indicating at least one of a predicted CQI or a predicted PMI for one or more future communications resources prior to the one or more future communications resources occurring in time. In particular, a future communications resource may refer to a communications resource that has not yet occurred in time. For example, the UE 104 may use a trained AI/ML model as discussed, to predict CQI and/or PMI for one or more future communications resources.

This can help the network entity make better scheduling decisions, and can result in reduced interference and improved link quality. For example, the network entity can avoid scheduling the UE on future communications resources predicted as having high interference. Additionally, the UE can use the predicted interference on a future communications resource it is scheduled to communicate on, with information about the time/frequency correlations of the interference to be used in demodulating a received signal to better cancel the interference.

Figure 5:
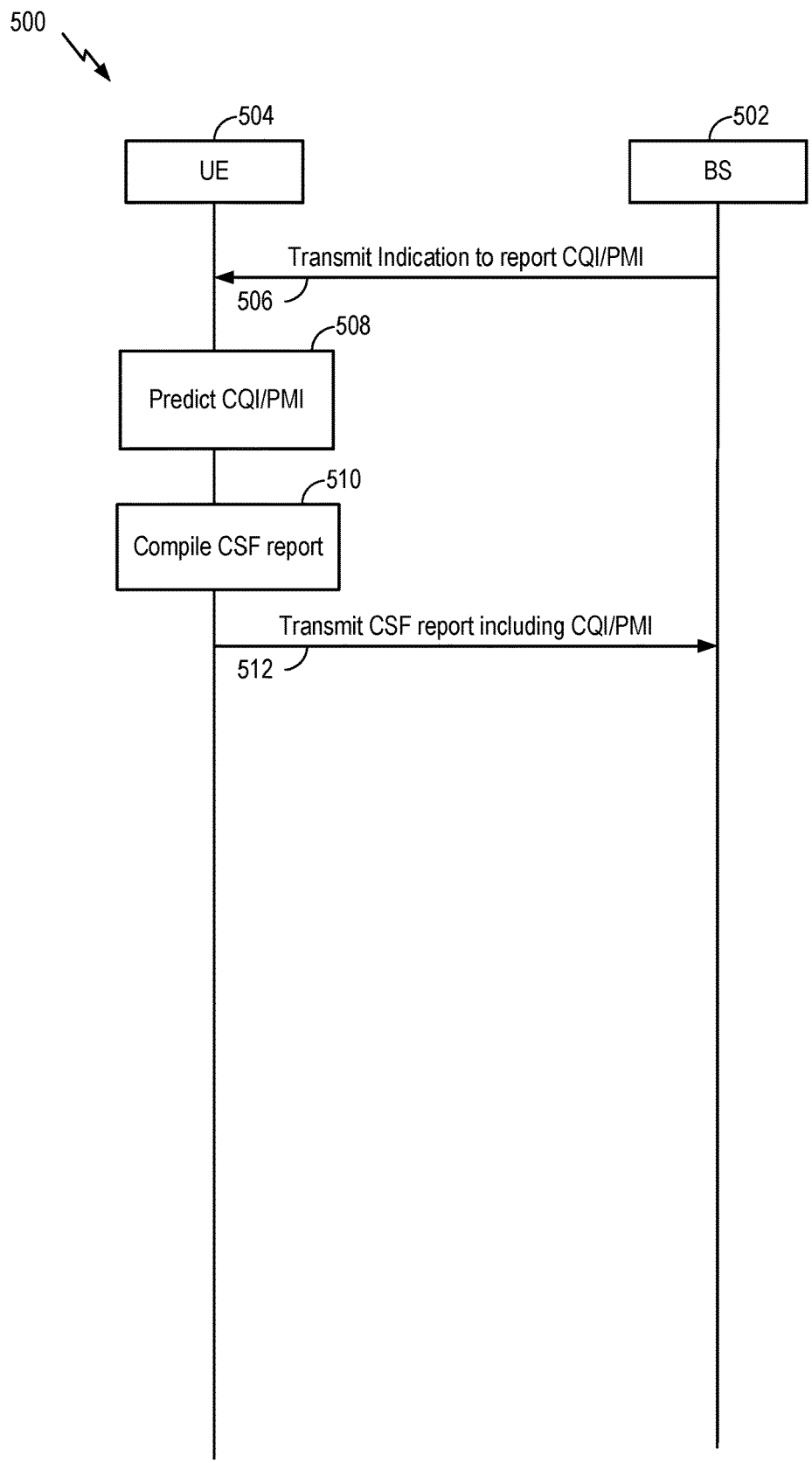
FIG. 5 depicts a process flow for channel estimate and/or interference reporting for future communications resources.

FIG. 5 depicts a process flow 500 for channel estimate and/or interference reporting for future communications resources. In some aspects, the BS 502 may be an example of the BS 102 depicted and described with respect to FIGS. 1 and 3. Similarly, the UE 504 may be an example of UE 104 depicted and described with respect to FIGS. 1 and 3. However, in other aspects, UE 504 may be another type of wireless communications device and BS 502 may be another type of network entity or network node, such as those described herein. Although FIG. 5 illustrates one UE, the techniques disclosed herein can support any suitable number of UEs.

In some aspects, prior to process flow 500, UE 504 reports to BS 502 capability information indicating whether UE 504 can predict a channel estimate or interference for future communications resources, such as predicting CQI and/or PMI for future communications resources. In certain aspects, process flow 500 may only occur if UE 104 is capable of predicting a channel estimate or interference for future communications resources. In certain aspects, if the UE 504 is capable of predicting a channel estimate or interference for future communications resources, the capability information includes a maximum future time (e.g., N time steps into the future, such as N slots) for which the UE is capable of predicting a channel estimate or interference.

At 506, the BS 502 may transmit an indication to perform channel estimate and/or interference reporting to UE 504 for one or more future communications resources. For example, the indication may be to report at least one of a channel quality indicator (CQI) or a pre-coding matrix indicator (PMI) for one or more future communications resources. In certain aspects, the indication is transmitted by BS 502 when the BS 502 receives UE capability information from UE 504 indicating that UE 504 is capable of performing channel estimate and/or interference prediction for future communications resources The indication can be transmitted by the BS 502 to the UE 504 via a signal such as a radio resource control (RRC) message (e.g., for static configuration), a medium access control (MAC) control element (CE) (MAC-CE) (e.g., for semi-static configuration), or a downlink control information (DCI) (e.g., for dynamic configuration).

In certain aspects, the indication can include a configuration (e.g., one or more parameters) of the one or more future communications resources for which the UE 504 should perform channel estimate and/or interference reporting. Though certain aspects are described with respect to the indication including the configuration, in certain aspects, the configuration may be sent to the UE 504 separately from the indication. In certain aspects, the configuration can be used by UE 504 to identify the one or more future communications resources. In certain aspects, the BS 502 only configures reporting future communications resources that are within a maximum future time (e.g., relative to transmission of the indication) for which the UE is capable of predicting a channel estimate or interference.

In certain aspects, the one or more future communications resources may include one or more time and frequency resources, and the one or more parameters included in the indication may include a configuration of the one or more time and frequency resources.

In certain aspects, the indication may include one or more parameters that define a time window corresponding to the one or more future communications resources. In certain aspects, the one or more parameters indicate a start of the time window and a length of the time window. In certain aspects, the start of the time window is defined by an index value, such as a slot index and/or a symbol index. In certain aspects, the start of the time window is defined relative to an end time (e.g., last slot and/or symbol) of a measurement or reporting occasion, such as a channel state information measurement reporting occasion. As an example, the start time may be defined as N slots after the last slot in which UE 504 received a CSI-RS. In certain aspects, the length of the time window may be defined in terms of a number of slots and/or symbols.

In certain aspects, the indication may include one or more parameters that define a frequency range corresponding to the one or more future communications resources. In certain aspects, the one or more parameters indicate a start of the frequency range and a bandwidth/length of the frequency. In certain aspects, the start of the frequency range is defined by an index value, such as a resource block group (RBG) index and/or a resource block (RB) index. In certain aspects, the bandwidth/length of the frequency range may be defined in terms of a number of RBGs and/or RBs. In certain aspects, the size of an RBG may be defined or configured by BS 502 at UE 504.

In certain aspects, the indication may include one or more parameters that define one or more beams corresponding to the one or more future communications resources. For example, the one or more parameters may indicate one or more receive beams of UE 504. In certain aspects, the one or more parameters configure a quasi-co-location (QCL) of a transmit beam of the network entity. For example, the one or more parameters may indicate that one or more receive beams of UE 504 are quasi-co-located ("QCL'ed") with the transmit beam of the network entity, such that the one or more future communications resources correspond to the one or more receive beams. In certain aspects, BS 502 may select one or more beams for the UE 504 to predict channel estimate and/or interference based on messaging from UE 504. For example, the UE 504 may transmit to BS 502 a recommended QCL of a transmit beam or receive beam, or an indication of a receive beam for the UE 504 to predict channel estimate and/or interference. The BS 502 may or may not follow the recommendation of the UE 504.

In certain aspects, the indication may define a plurality of frequency ranges and/or time windows.

Figure 6:
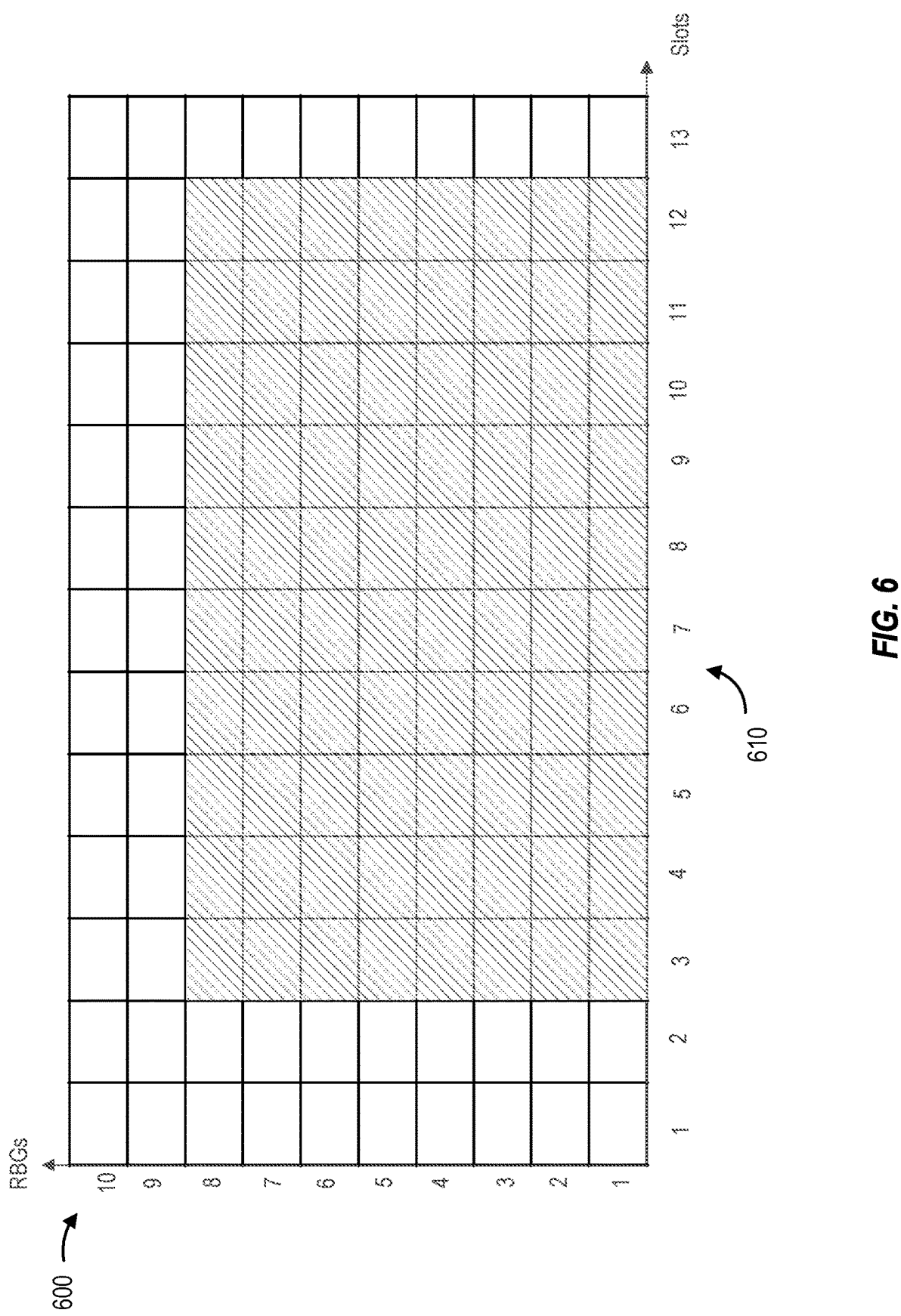
FIG. 6 depicts an example time window and frequency range corresponding to a plurality of future communications resources.

FIG. 6 depicts an example time window and frequency range 610 corresponding to a plurality of future communications resources. A plurality of future communications resources 600 are shown, wherein a subset of the plurality of future communications resources 600 are included in time window and frequency range 610. In certain aspects, UE 504 is configured to report channel estimate and/or interference for the subset of the plurality of future communications resources 600 included in time window and frequency range 610, and not for any of the plurality of future communications resources 600 not included in time window and frequency range 610. In certain aspects, time window and frequency range 610 is defined by parameters including: a start time (e.g., slot 3), a length of the time window (e.g., 10 slots), a start of the frequency range (e.g., RBG 1), and a length of the frequency range (e.g., 8 RBGs). Though the plurality of future communications resources 600 are shown in terms of slots and RBGs, it should be noted that other suitable future communications resources in time, frequency, and/or space (e.g., corresponding to one or more beams) may be used.

In response to receiving the indication, at 508, UE 504 predicts a channel estimate and/or interference for each of the one or more future communications resources, such as using a machine learning model (e.g., a linear regression model, a logistic regression model, a neural network and/or the like) as discussed. In certain aspects, UE 504 predicts the channel estimate and/or interference based on the predicting the interference (e.g., a power level of interference) for the one or more future communications resources. For example, UE 504 predicts CQI and/or PMI for the one or more future communications resources based on predicting the interference for each of the one or more future communications resources.

Continuing, at 510, UE 504 generates a report of channel estimation and/or interference for the one or more future communications resources for which the UE 504 predicts a channel estimate and/or interference. In some aspects, the report is a channel state feedback (CSF) report. In certain aspects, the report includes a separate value for the predicted channel estimate and/or the predicted interference (e.g., CQI and/or PMI) for each of the one or more future communications resources. For example, where there are N future communications resources, the report includes N channel estimates values and/or N interference values, where each value is the channel estimate value or the interference value of the associated future communications resource.

In certain aspects, the report includes one channel estimate value and/or one interference value (e.g., a single CQI value and/or single PMI value, such as an average value, minimum value, maximum value, etc.) for a group of future communications resources (e.g., a separate value for each group for which the report includes a prediction). For example, where the report is for a plurality of future communications resources, the plurality of future communications resources may be divided into one or more groups. In certain aspects, the one or more groups are non-overlapping. In certain aspects, each group includes multiple future communications resources. In certain aspects, certain groups may include only one future communications resource, while other groups include multiple future communications resources. For example, each group may be defined by a time window and frequency range. In certain aspects, the report includes one or more parameters that define the time window and/or frequency range of the group, such parameters discussed herein with respect to defining time windows and frequency ranges.

In certain aspects, where the report includes one channel estimate value and/or one interference value for a group of future communications resources, the report further includes one or more delta values for one or more future communications resources of the group of future communications resources. In certain aspects, the delta value of a future communications resource indicates the difference between the one channel estimate value and/or one interference value for the group, and the channel estimate or interference value for the future communications resource. For example, UE 504 may determine a predicted channel estimate value or predicted interference value X (e.g., a single value of the predicted CQI and/or the predicted PMI) for a group of future communications resources. Within the group of future communications resources, UE 504 may have predicted a predicted channel estimate value or predicted interference value Y (e.g., a predicted CQI and/or a predicted PMI) for a first future communications resource. Accordingly, the delta value for the first future communications resource may be Y-X. Use of a single base value for the group, and delta values for individual future communications resources, may require reduced number of bits for reporting, as compared to a separate value for each individual future communications resource.

Figure 7:
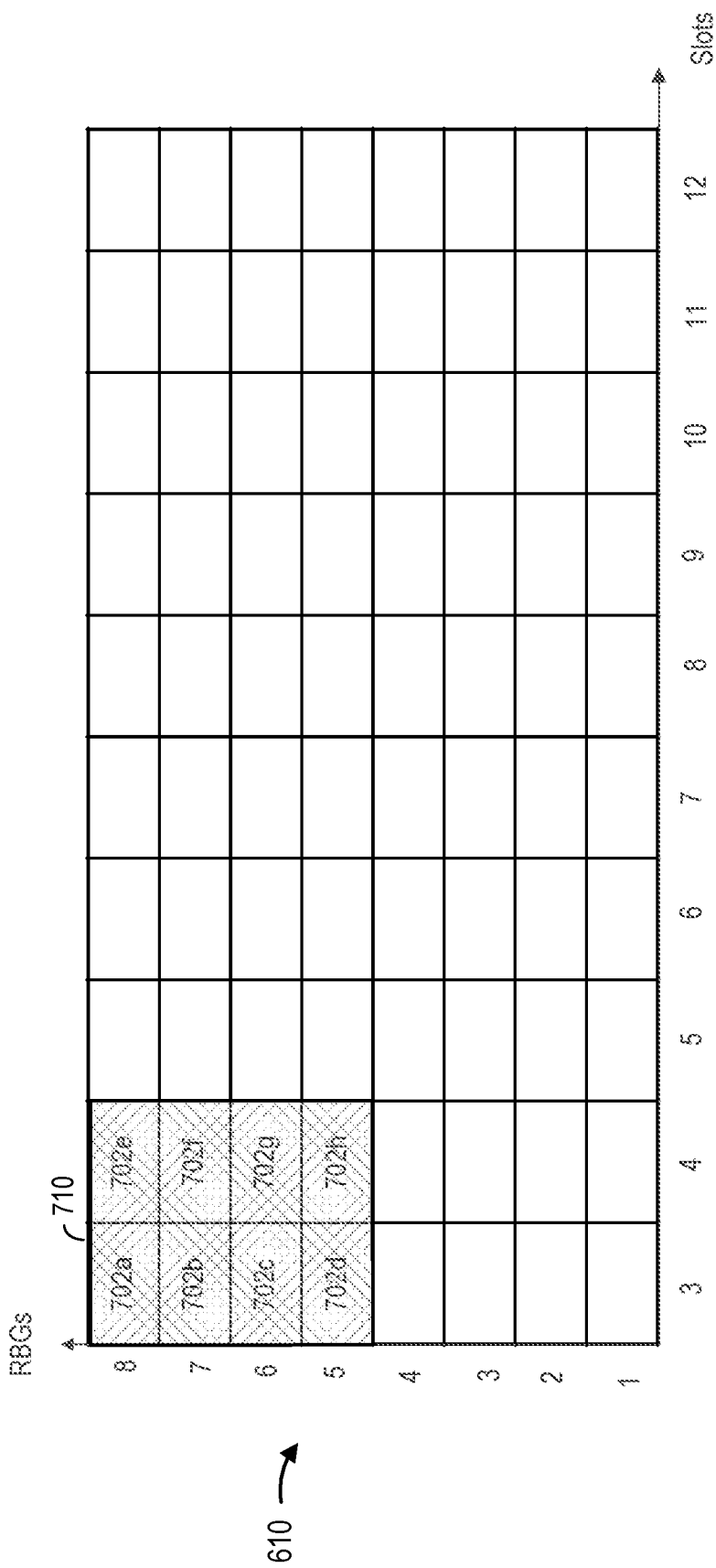
FIG. 7 depicts an example group of future communications resources.

FIG. 7 depicts an example group of future communications resources 710. As shown, the group of future communications resources 710 is a subset of time window and frequency range 610, in an example. In certain aspects, the report includes one or more parameters defining the group of future communications resources 710, such as a start slot of 3, a length of 2 slots, a start RBG of 5, and a length of RBGs of 4. In certain aspects, the report includes one channel estimate value and/or one interference value for the group of future communications resources 710, such as a single value of predicted CQI and/or predicted PMI, X. In certain aspects, the report includes a separate delta value associated with the channel estimate value and/or interference value (e.g., the predicted CQI and/or PMI) for each of future communications resources 702a-702h. It should be noted that though future communications resources in a group are shown as contiguous in time and frequency, in certain aspects, a group includes future communications resources that are not contiguous in time and/or frequency.

At 512, UE 504 transmits the report to BS 502. In some aspects, the interference report is a CSF report as described above. In some aspects, the report is transmitted by the UE 504 to BS 502 the via a signal such as a radio resource control (RRC) message, a medium access control (MAC) control element (CE) (MAC-CE), or a downlink control information (DCI).

After receiving the report, in certain aspects, BS 502 may schedule UE 504 to communicate on at least one of the future communications resources. The BS 502 may select the at least one of the future communications resources associated with lower interference, thereby avoiding scheduling the UE on communications resources predicted as having high interference.

Example Operations of a User Equipment

Figure 8:
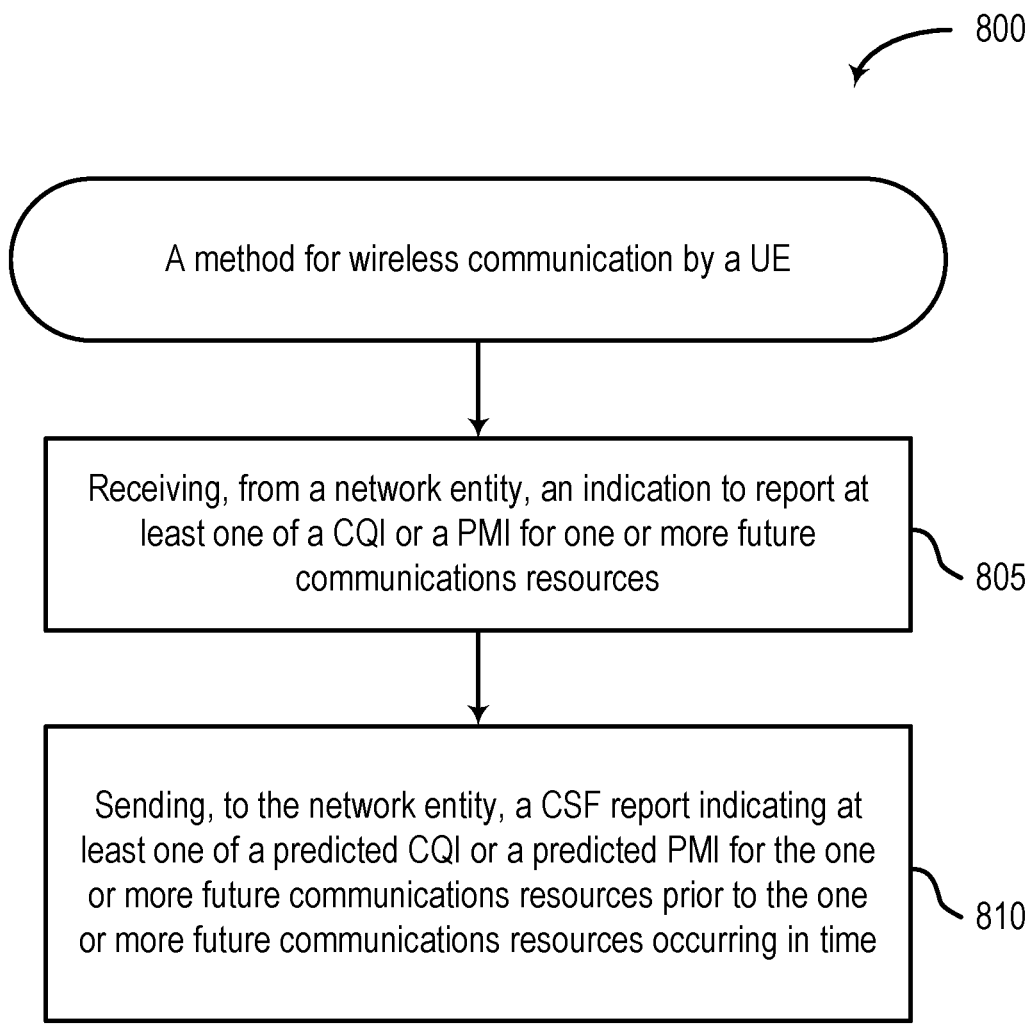
FIG. 8 depicts a method for wireless communications.

FIG. 8 shows a method 800 for wireless communications by a UE, such as UE 104 of FIGS. 1 and 3.

Method 800 begins at 805 with receiving, from a network entity, an indication to report at least one of a CQI or a PMI for one or more future communications resources. In some cases, the operations of this step refer to, or may be performed by, reporting configuration circuitry as described with reference to FIG. 10.

Method 800 then proceeds to step 810 with sending, to the network entity, a CSF report indicating at least one of a predicted CQI or a predicted PMI for the one or more future communications resources prior to the one or more future communications resources occurring in time. In some cases, the operations of this step refer to, or may be performed by, CSF reporting circuitry as described with reference to FIG. 10.

Various aspects relate to the method 800, including the following aspects.

In some aspects, the indication is received in one of a RRC message, a MAC-CE, or a DCI. In some aspects, the one or more future communications resources comprise one or more time and frequency resources, and wherein the indication comprises a configuration of the one or more time and frequency resources. In some aspects, the configuration comprises a time window for the one or more future communications resources. In some aspects, a start of the time window is defined relative to a measurement or reporting occasion. In some aspects, the configuration comprises a frequency range for the one or more future communications resources. In some aspects, the CSF report indicating the at least one of the predicted CQI or the predicted PMI indicates a separate value for the at least one of the predicted CQI or the predicted PMI for each of the one or more future communications resources. In some aspects, the CSF report indicating the at least one of the predicted CQI or the predicted PMI indicates a single value for the at least one of the predicted CQI or the predicted PMI that corresponds to all of the one or more future communications resources. In some aspects, the CSF report further indicates a delta value for at least one of the one or more future communications resources, the delta value along with the single value corresponding to the at least one of the one or more future communications resources.

In some aspects, method 800 further includes transmitting, to the network entity, capability information of the UE indicating the UE is capable of predicting interference on future communications resources. In some aspects, the capability information comprises a maximum future time for which the UE is capable of predicting interference. In some aspects, the one or more future communications resources comprise one or more beams. In some aspects, the indication comprises a configuration of a QCL of a transmit beam of the network entity or a configuration of a receive beam of the UE to be used for predicting interference.

In some aspects, method 800 further includes transmitting, to the network entity, a message indicating a recommended configuration of a QCL of a transmit beam of the network entity or a configuration of a receive beam of the UE to be used for predicting interference. In some aspects, the sending the CSF report is based on the receiving the indication.

In some aspects, method 800 further includes predicting interference for the one or more future communications resources, wherein the at least one of the predicted CQI or the predicted PMI is based on the predicting the interference.

Figure 10:
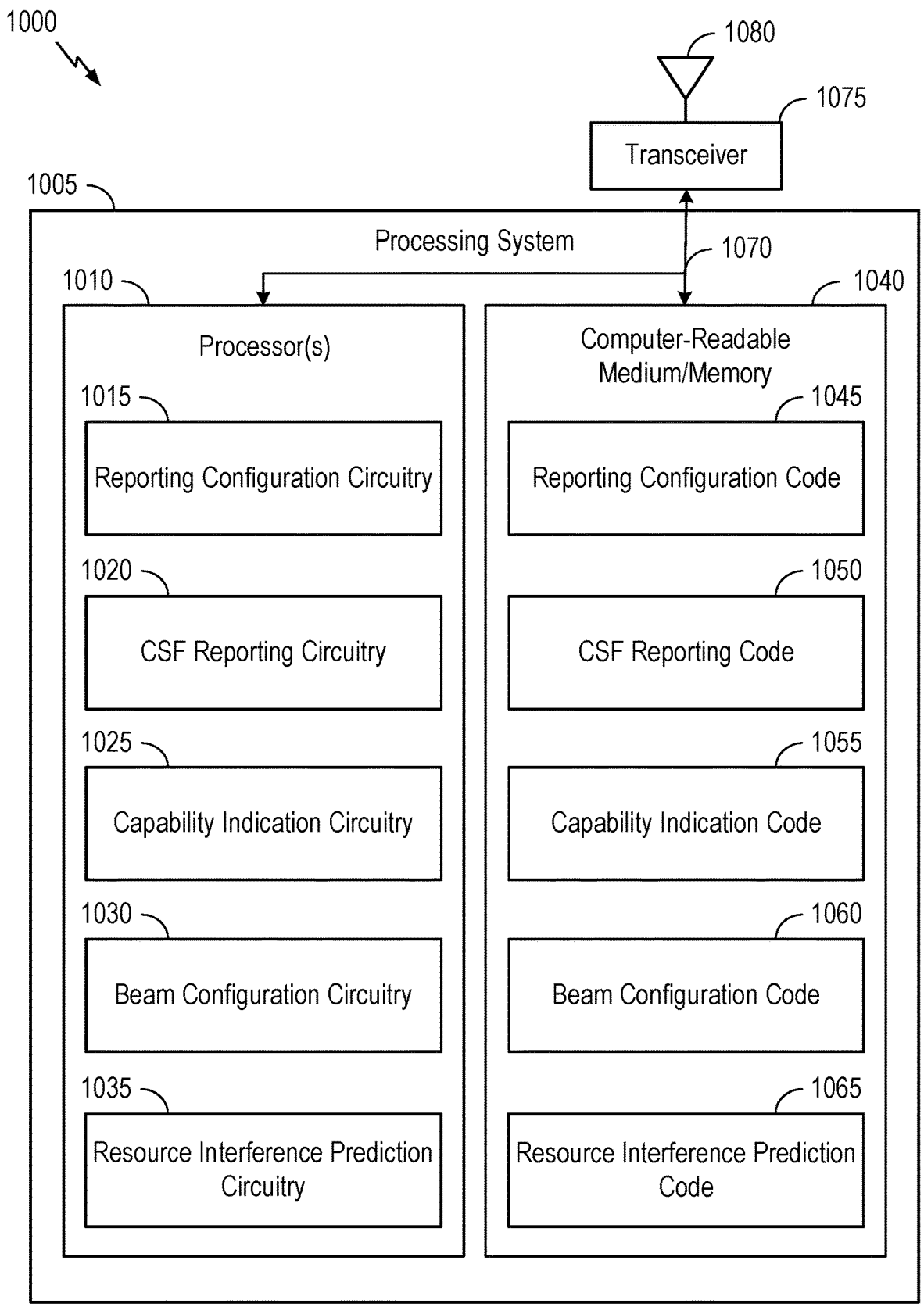
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Operations of a Network Entity

Figure 9:
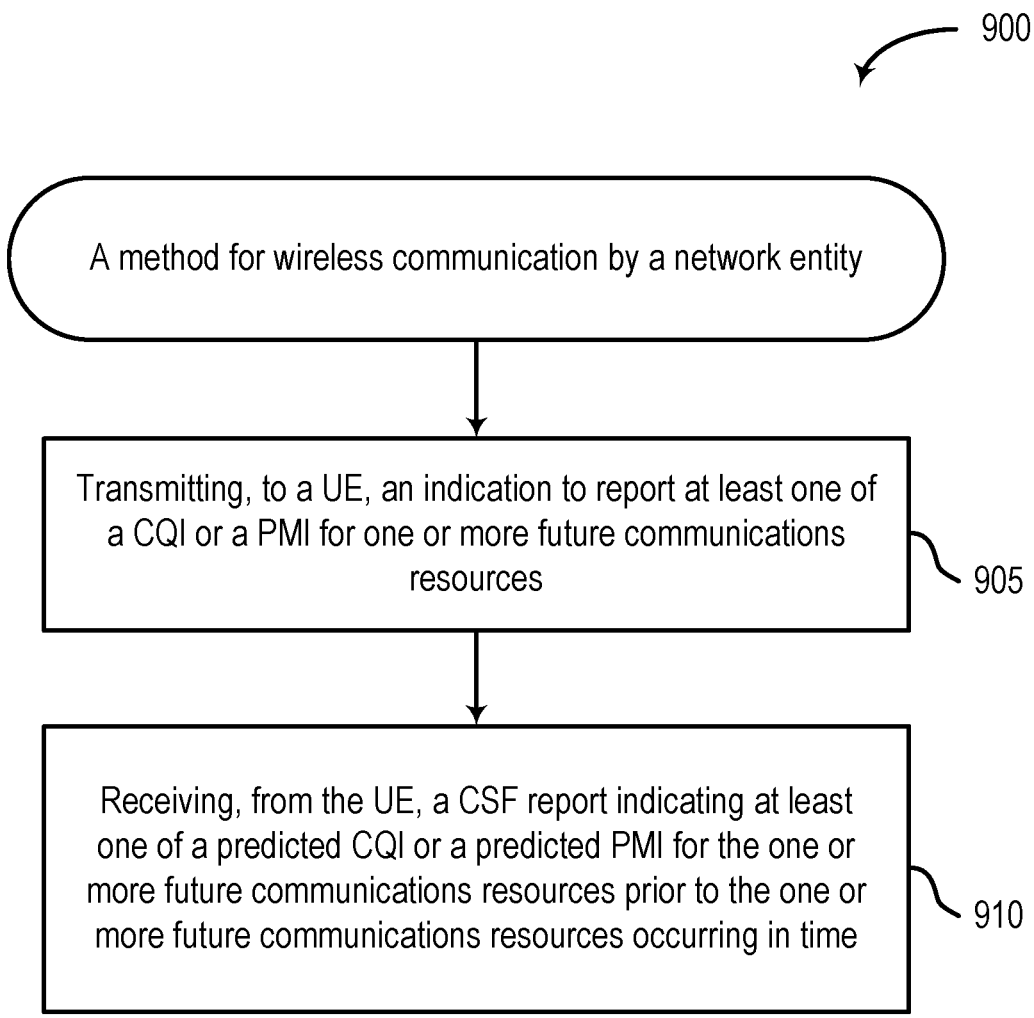
FIG. 9 depicts a method for wireless communications.

FIG. 9 shows a method 900 for wireless communications by a network entity, such as BS 102 of FIGS. 1 and 3, or a disaggregated base station as discussed with respect to FIG. 2.

Method 900 begins at 905 with transmitting, to a UE, an indication to report at least one of a CQI or a PMI for one or more future communications resources. In some cases, the operations of this step refer to, or may be performed by, UE report configuration circuitry as described with reference to FIG. 11.

Method 900 then proceeds to step 910 with receiving, from the UE, a CSF report indicating at least one of a predicted CQI or a predicted PMI for the one or more future communications resources prior to the one or more future communications resources occurring in time. In some cases, the operations of this step refer to, or may be performed by, CSF report reception circuitry as described with reference to FIG. 11.

Various aspects relate to the method 900, including the following aspects.

In some aspects, the indication is transmitted in one of a RRC message, a MAC-CE, or a DCI. In some aspects, the one or more future communications resources comprise one or more time and frequency resources, and wherein the indication comprises a configuration of the one or more time and frequency resources. In some aspects, the configuration comprises a time window for the one or more future communications resources. In some aspects, a start of the time window is defined relative to a measurement or reporting occasion. In some aspects, the configuration comprises a frequency range for the one or more future communications resources.

In some aspects, the CSF report indicating the at least one of the predicted CQI or the predicted PMI indicates a separate value for the at least one of the predicted CQI or the predicted PMI for each of the one or more future communications resources. In some aspects, the CSF report indicating the at least one of the predicted CQI or the predicted PMI indicates a single value for the at least one of the predicted CQI or the predicted PMI that corresponds to all of the one or more future communications resources. In some aspects, the CSF report further indicates a delta value for at least one of the one or more future communications resources, the delta value along with the single value corresponding to the at least one of the one or more future communications resources. In some aspects, the one or more future communications resources comprise one or more beams. In some aspects, the indication comprises a configuration of a QCL of a transmit beam of the network entity or a configuration of a receive beam of the UE to be used for predicting interference.

In some aspects, method 900 further includes receiving, from the UE, a message indicating a recommended configuration of a QCL of a transmit beam of the network entity or a configuration of a receive beam of the UE to be used for predicting interference.

Figure 11:
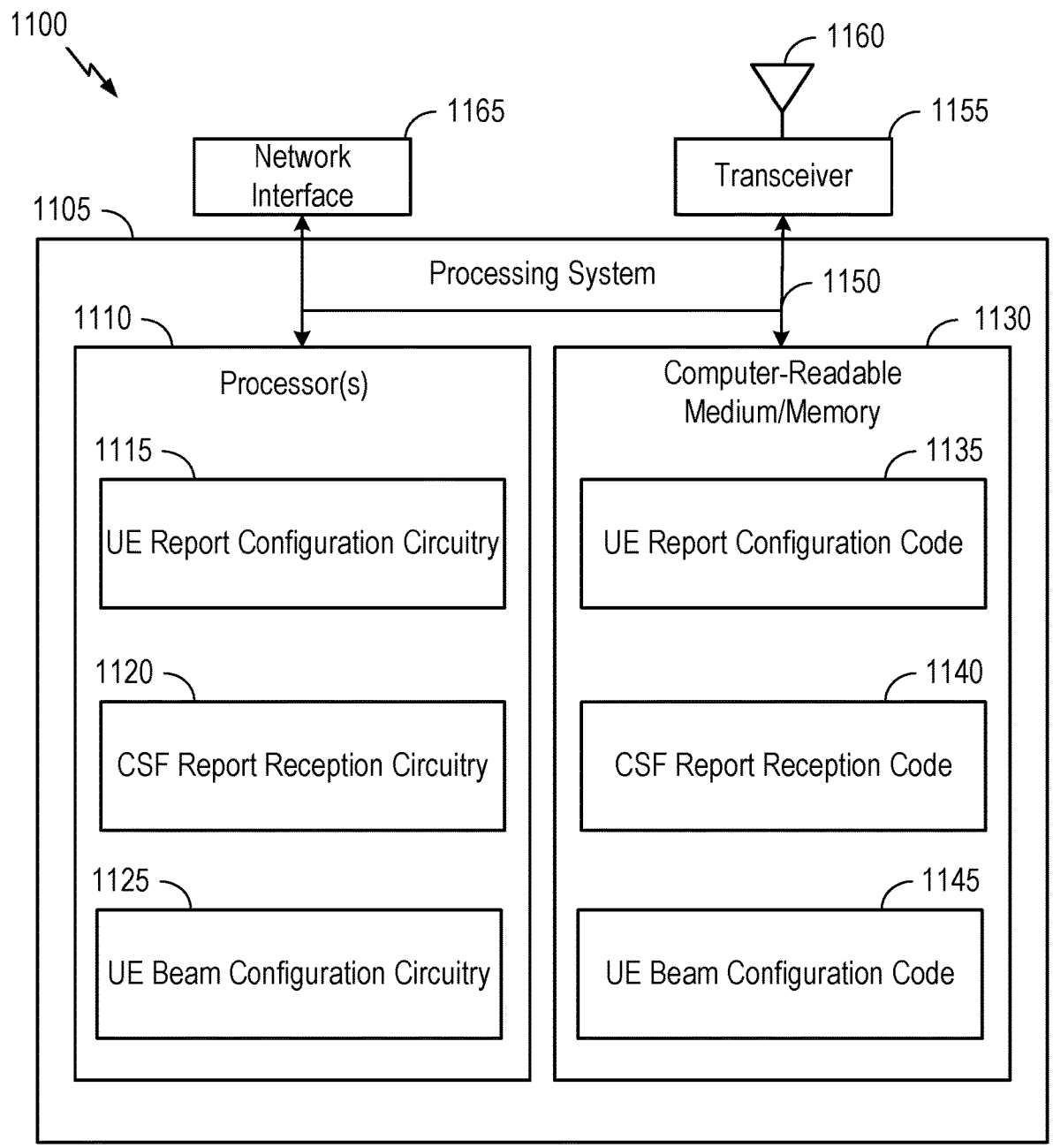
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Devices

FIG. 10 depicts aspects of an example communications device 1000. In some aspects, communications device 1000 is a user equipment, such as UE 104 described above with respect to FIGS. 1 and 3.

The communications device 1000 includes a processing system 1005 coupled to the transceiver 1075 (e.g., a transmitter and/or a receiver). The transceiver 1075 is configured to transmit and receive signals for the communications device 1000 via the antenna 1080, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1040 via a bus 1070. In certain aspects, the computer-readable medium/memory 1040 is configured to store instructions (e.g., computer-executable code) that when executed by the one or more processors 1010, cause the one or more processors 1010 to perform the method 800 described with respect to FIG. 8, or any aspect related to it. Note that reference to a processor performing a function of communications device 1000 may include one or more processors 1010 performing that function of communications device 1000.

In the depicted example, computer-readable medium/memory 1040 stores code (e.g., executable instructions), such as reporting configuration code 1045, CSF reporting code 1050, capability indication code 1055, beam configuration code 1060, and resource interference prediction code 1065. Processing of the reporting configuration code 1045, CSF reporting code 1050, capability indication code 1055, beam configuration code 1060, and resource interference prediction code 1065 may cause the communications device 1000 to perform the method 800 described with respect to FIG. 8, or any aspect related to it.

The one or more processors 1010 include circuitry configured to implement (e.g., execute) the code stored in the computer-readable medium/memory 1040, including circuitry such as reporting configuration circuitry 1015, CSF reporting circuitry 1020, capability indication circuitry 1025, beam configuration circuitry 1030, and resource interference prediction circuitry 1035. Processing with reporting configuration circuitry 1015, CSF reporting circuitry 1020, capability indication circuitry 1025, beam configuration circuitry 1030, and resource interference prediction circuitry 1035 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 1075 and the antenna 1080 of the communications device 1000 in FIG. 10. Means for receiving or obtaining may include transceivers 354 and/or antenna(s) 352 of the UE 104 illustrated in FIG. 3 and/or the transceiver 1075 and the antenna 1080 of the communications device 1000 in FIG. 10.

According to some aspects, reporting configuration circuitry 1015 receives, from a network entity, an indication to report at least one of a CQI or a PMI for one or more future communications resources. According to some aspects, CSF reporting circuitry 1020 sends, to the network entity, a CSF report indicating at least one of a predicted CQI or a predicted PMI for the one or more future communications resources prior to the one or more future communications resources occurring in time.

In some aspects, the indication is received in one of a RRC message, a MAC-CE, or a DCI. In some aspects, the one or more future communications resources comprise one or more time and frequency resources, and wherein the indication comprises a configuration of the one or more time and frequency resources. In some aspects, the configuration comprises a time window for the one or more future communications resources. In some aspects, a start of the time window is defined relative to a measurement or reporting occasion. In some aspects, the configuration comprises a frequency range for the one or more future communications resources. In some aspects, the CSF report indicating the at least one of the predicted CQI or the predicted PMI indicates a separate value for the at least one of the predicted CQI or the predicted PMI for each of the one or more future communications resources. In some aspects, the CSF report indicating the at least one of the predicted CQI or the predicted PMI indicates a single value for the at least one of the predicted CQI or the predicted PMI that corresponds to all of the one or more future communications resources. In some aspects, the CSF report further indicates a delta value for at least one of the one or more future communications resources, the delta value along with the single value corresponding to the at least one of the one or more future communications resources.

According to some aspects, capability indication circuitry 1025 transmits, to the network entity, capability information of the UE indicating the UE is capable of predicting interference on future communications resources. In some aspects, the capability information comprises a maximum future time for which the UE is capable of predicting interference. In some aspects, the one or more future communications resources comprise one or more beams. In some aspects, the indication comprises a configuration of a QCL of a transmit beam of the network entity or a configuration of a receive beam of the UE to be used for predicting interference.

According to some aspects, beam configuration circuitry 1030 transmits, to the network entity, a message indicating a recommended configuration of a QCL of a transmit beam of the network entity or a configuration of a receive beam of the UE to be used for predicting interference. In some aspects, the sending the CSF report is based on the receiving the indication.

According to some aspects, resource interference prediction circuitry 1035 predicts interference for the one or more future communications resources, wherein the at least one of the predicted CQI or the predicted PMI is based on the predicting the interference.

FIG. 11 depicts aspects of an example communications device 1100. In some aspects, communications device 1100 is a network entity, such as BS 102 described above with respect to FIGS. 1 and 3.

The communications device 1100 includes a processing system 1105 coupled to the transceiver 1155 (e.g., a transmitter and/or a receiver) and/or a network interface 1165. The transceiver 1155 is configured to transmit and receive signals for the communications device 1100 via the antenna 1160, such as the various signals as described herein. The network interface 1165 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1130 via a bus 1150. In certain aspects, the computer-readable medium/memory 1130 is configured to store instructions (e.g., computer-executable code) that when executed by the one or more processors 1110, cause the one or more processors 1110 to perform the method 900 described with respect to FIG. 9, or any aspect related to it. Note that reference to a processor of communications device 1100 performing a function may include one or more processors 1110 of communications device 1100 performing that function.

In the depicted example, the computer-readable medium/memory 1130 stores code (e.g., executable instructions), such as UE report configuration code 1135, CSF report reception code 1140, and UE beam configuration code 1145. Processing of the UE report configuration code 1135, CSF report reception code 1140, and UE beam configuration code 1145 may cause the communications device 1100 to perform the method 900 described with respect to FIG. 9, or any aspect related to it.

The one or more processors 1110 include circuitry configured to implement (e.g., execute) the code stored in the computer-readable medium/memory 1130, including circuitry such as UE report configuration circuitry 1115, CSF report reception circuitry 1120, and UE beam configuration circuitry 1125. Processing with UE report configuration circuitry 1115, CSF report reception circuitry 1120, and UE beam configuration circuitry 1125 may cause the communications device 1100 to perform the method 900 as described with respect to FIG. 9, or any aspect related to it.

Various components of the communications device 1100 may provide means for performing the method 900 as described with respect to FIG. 9, or any aspect related to it. Means for transmitting, sending or outputting for transmission may include transceivers 332 and/or antenna(s) 334 of the BS 102 illustrated in FIG. 3 and/or the transceiver 1155 and the antenna 1160 of the communications device 1100 in FIG. 11. Means for receiving or obtaining may include transceivers 332 and/or antenna(s) 334 of the BS 102 illustrated in FIG. 3 and/or the transceiver 1155 and the antenna 1160 of the communications device 1100 in FIG. 11.

According to some aspects, UE report configuration circuitry 1115 transmits, to a UE, an indication to report at least one of a CQI or a PMI for one or more future communications resources. According to some aspects, CSF report reception circuitry 1120 receives, from the UE, a CSF report indicating at least one of a predicted CQI or a predicted PMI for the one or more future communications resources prior to the one or more future communications resources occurring in time.

In some aspects, the indication is transmitted in one of a RRC message, a MAC-CE, or a DCI. In some aspects, the one or more future communications resources comprise one or more time and frequency resources, and wherein the indication comprises a configuration of the one or more time and frequency resources. In some aspects, the configuration comprises a time window for the one or more future communications resources. In some aspects, a start of the time window is defined relative to a measurement or reporting occasion. In some aspects, the configuration comprises a frequency range for the one or more future communications resources. In some aspects, the CSF report indicating the at least one of the predicted CQI or the predicted PMI indicates a separate value for the at least one of the predicted CQI or the predicted PMI for each of the one or more future communications resources. In some aspects, the CSF report indicating the at least one of the predicted CQI or the predicted PMI indicates a single value for the at least one of the predicted CQI or the predicted PMI that corresponds to all of the one or more future communications resources. In some aspects, the CSF report further indicates a delta value for at least one of the one or more future communications resources, the delta value along with the single value corresponding to the at least one of the one or more future communications resources. In some aspects, the one or more future communications resources comprise one or more beams. In some aspects, the indication comprises a configuration of a QCL of a transmit beam of the network entity or a configuration of a receive beam of the UE to be used for predicting interference.

According to some aspects, UE beam configuration circuitry 1125 receives, from the UE, a message indicating a recommended configuration of a QCL of a transmit beam of the network entity or a configuration of a receive beam of the UE to be used for predicting interference.

Example Clauses

Implementation examples are described in the following numbered clauses:

Clause 1: A method for wireless communications by a UE, comprising: receiving, from a network entity, an indication to report at least one of a CQI or a PMI for one or more future communications resources; and sending, to the network entity, a CSF report indicating at least one of a predicted CQI or a predicted PMI for the one or more future communications resources prior to the one or more future communications resources occurring in time.

Clause 2: The method of Clause 1, wherein the indication is received in one of a RRC message, a MAC-CE, or a DCI.

Clause 3: The method of any one of Clauses 1 and 2, wherein the one or more future communications resources comprise one or more time and frequency resources, and wherein the indication comprises a configuration of the one or more time and frequency resources.

Clause 4: The method of Clause 3, wherein the configuration comprises a time window for the one or more future communications resources.

Clause 5: The method of Clause 4, wherein a start of the time window is defined relative to a measurement or reporting occasion.

Clause 6: The method of Clause 3, wherein the configuration comprises a frequency range for the one or more future communications resources.

Clause 7: The method of any one of Clauses 1-6, wherein the CSF report indicating the at least one of the predicted CQI or the predicted PMI indicates a separate value for the at least one of the predicted CQI or the predicted PMI for each of the one or more future communications resources.

Clause 8: The method of any one of Clauses 1-7, wherein the CSF report indicating the at least one of the predicted CQI or the predicted PMI indicates a single value for the at least one of the predicted CQI or the predicted PMI that corresponds to all of the one or more future communications resources.

Clause 9: The method of Clause 8, wherein the CSF report further indicates a delta value for at least one of the one or more future communications resources, the delta value along with the single value corresponding to the at least one of the one or more future communications resources.

Clause 10: The method of any one of Clauses 1-9, further comprising: transmitting, to the network entity, capability information of the UE indicating the UE is capable of predicting interference on future communications resources.

Clause 11: The method of Clause 10, wherein the capability information comprises a maximum future time for which the UE is capable of predicting interference.

Clause 12: The method of any one of Clauses 1-11, wherein the one or more future communications resources comprise one or more beams.

Clause 13: The method of Clause 12, wherein the indication comprises a configuration of a QCL of a transmit beam of the network entity or a configuration of a receive beam of the UE to be used for predicting interference.

Clause 14: The method of any one of Clauses 1-13, further comprising: transmitting, to the network entity, a message indicating a recommended configuration of a QCL of a transmit beam of the network entity or a configuration of a receive beam of the UE to be used for predicting interference.

Clause 15: The method of any one of Clauses 1-14, wherein the sending the CSF report is based on the receiving the indication.

Clause 16: The method of any one of Clauses 1-15, further comprising: predicting interference for the one or more future communications resources, wherein the at least one of the predicted CQI or the predicted PMI is based on the predicting the interference.

Clause 17: A method for wireless communications by a network entity, comprising: transmitting, to a UE, an indication to report at least one of a CQI or a PMI for one or more future communications resources; and receiving, from the UE, a CSF report indicating at least one of a predicted CQI or a predicted PMI for the one or more future communications resources prior to the one or more future communications resources occurring in time.

Clause 18: The method of Clause 17, wherein the indication is transmitted in one of a RRC message, a MAC-CE, or a DCI.

Clause 19: The method of any one of Clauses 17 and 18, wherein the one or more future communications resources comprise one or more time and frequency resources, and wherein the indication comprises a configuration of the one or more time and frequency resources.

Clause 20: The method of Clause 19, wherein the configuration comprises a time window for the one or more future communications resources.

Clause 21: The method of Clause 20, wherein a start of the time window is defined relative to a measurement or reporting occasion.

Clause 22: The method of Clause 19, wherein the configuration comprises a frequency range for the one or more future communications resources.

Clause 23: The method of any one of Clauses 17-22, wherein the CSF report indicating the at least one of the predicted CQI or the predicted PMI indicates a separate value for the at least one of the predicted CQI or the predicted PMI for each of the one or more future communications resources.

Clause 24: The method of any one of Clauses 17-23, wherein the CSF report indicating the at least one of the predicted CQI or the predicted PMI indicates a single value for the at least one of the predicted CQI or the predicted PMI that corresponds to all of the one or more future communications resources.

Clause 25: The method of Clause 24, wherein the CSF report further indicates a delta value for at least one of the one or more future communications resources, the delta value along with the single value corresponding to the at least one of the one or more future communications resources.

Clause 26: The method of any one of Clauses 17-25, wherein the one or more future communications resources comprise one or more beams.

Clause 27: The method of Clause 26, wherein the indication comprises a configuration of a QCL of a transmit beam of the network entity or a configuration of a receive beam of the UE to be used for predicting interference.

Clause 28: The method of any one of Clauses 17-27, further comprising: receiving, from the UE, a message indicating a recommended configuration of a QCL of a transmit beam of the network entity or a configuration of a receive beam of the UE to be used for predicting interference.

Clause 29: A processing system, comprising: a memory comprising computer-executable instructions; one or more processors configured to execute the computer-executable instructions and cause the processing system to perform a method in accordance with any one of Clauses 1-28.

Clause 30: A processing system, comprising means for performing a method in accordance with any one of Clauses 1-28.

Clause 31: A non-transitory computer-readable medium comprising computer-executable instructions that, when executed by one or more processors of a processing system, cause the processing system to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising:
    one or more memories comprising instructions; and
    one or more processors configured to execute the instructions and cause the apparatus to:
        receive, from a network entity, an indication to report at least one of a channel quality indicator (CQI) or a pre-coding matrix indicator (PMI) for one or more future communications resources, wherein the one or more future communications resources are within a maximum number of resources, as per capability information of the UE, relative to transmission of the indication from the network entity for which the UE is capable of predicting the COI or the PMI;
        transmit, to the network entity, a channel state feedback (CSF) report indicating at least one of a predicted CQI or a predicted PMI for the one or more future communications resources prior to the one or more future communications resources occurring in time; and
        receive, from the network entity, scheduling information scheduling the UE to communicate on at least one of the one or more future communications resources associated with a lower interference than other future communications resources based on the CSF report.

2. The apparatus of claim 1, wherein the indication is received in one of a radio resource control (RRC) message, a medium access control (MAC) control element (CE), or a downlink control information (DCI).

3. The apparatus of claim 1, wherein the one or more future communications resources comprise one or more time and frequency resources, and wherein the indication comprises a configuration of the one or more time and frequency resources.

4. The apparatus of claim 3, wherein the configuration comprises a time window for the one or more future communications resources.

5. The apparatus of claim 4, wherein a start of the time window is defined relative to a last slot or symbol of a measurement or reporting occasion.

6. The apparatus of claim 3, wherein the configuration comprises a frequency range for the one or more future communications resources.

7. The apparatus of claim 1, wherein the CSF report indicating the at least one of the predicted CQI or the predicted PMI indicates a separate value for the at least one of the predicted CQI or the predicted PMI for each of the one or more future communications resources.

8. The apparatus of claim 1, wherein the CSF report indicating the at least one of the predicted CQI or the predicted PMI indicates a single value for the at least one of the predicted CQI or the predicted PMI that corresponds to all of the one or more future communications resources.

9. The apparatus of claim 8, wherein the CSF report further indicates a delta value for at least one of the one or more future communications resources, the delta value along with the single value corresponding to the at least one of the one or more future communications resources.

10. The apparatus of claim 1, wherein the one or more processors are configured to execute the instructions and cause the apparatus to:
transmit, to the network entity, the capability information of the UE indicating the UE is capable of predicting interference on future communications resources.

11. The apparatus of claim 10, wherein the capability information comprises a maximum future time for which the UE is capable of predicting interference.

12. The apparatus of claim 1, wherein the one or more future communications resources comprise one or more beams.

13. The apparatus of claim 12, wherein the indication comprises a configuration of a quasi-co-location (QCL) of a transmit beam of the network entity or a configuration of a receive beam of the UE to be used for predicting interference.

14. The apparatus of claim 1, wherein the one or more processors are configured to execute the instructions and cause the apparatus to:
transmit, to the network entity, a message indicating a recommended configuration of a quasi-co-location (QCL) of a transmit beam of the network entity or a configuration of a receive beam of the UE to be used for predicting interference.

15. The apparatus of claim 1, wherein the CSF report is transmitted based on the receiving the indication.

16. The apparatus of claim 1, wherein the one or more processors are configured to execute the instructions and cause the apparatus to predict interference for the one or more future communications resources, wherein the at least one of the predicted CQI or the predicted PMI is based on the predicting the interference.

17. An apparatus for wireless communications at a network entity, comprising:
one or more memories comprising instructions; and
one or more processors configured to execute the instructions and cause the apparatus to:
transmit, to a user equipment (UE), an indication to report at least one of a channel quality indicator (CQI) or a pre-coding matrix indicator (PMI) for one or more future communications resources, wherein the one or more future communications resources are within a maximum future number of resources, as per capability information of the UE, relative to transmission of the indication from the network entity for which the UE is capable of predicting the CQI or the PMI;
receive, from the UE, a channel state feedback (CSF) report indicating at least one of a predicted CQI or a predicted PMI for the one or more future communications resources prior to the one or more future communications resources occurring in time; and
transmit, to the UE, scheduling information scheduling the UE to communicate on at least one of the one or more future communications resources associated with a lower interference than other future communications resources based on the CSF report.

18. The apparatus of claim 17, wherein the indication is transmitted in one of a radio resource control (RRC) message, a medium access control (MAC) control element (CE), or a downlink control information (DCI).

19. The apparatus of claim 17, wherein the one or more future communications resources comprise one or more time and frequency resources, and wherein the indication comprises a configuration of the one or more time and frequency resources.

20. The apparatus of claim 19, wherein the configuration comprises a time window for the one or more future communications resources.

21. The apparatus of claim 20, wherein a start of the time window is defined relative to a last slot or symbol of a measurement or reporting occasion.

22. The apparatus of claim 19, wherein the configuration comprises a frequency range for the one or more future communications resources.

23. The apparatus of claim 17, wherein the CSF report indicating the at least one of the predicted CQI or the predicted PMI indicates a separate value for the at least one of the predicted CQI or the predicted PMI for each of the one or more future communications resources.

24. The apparatus of claim 17, wherein the CSF report indicating the at least one of the predicted CQI or the predicted PMI indicates a single value for the at least one of the predicted CQI or the predicted PMI that corresponds to all of the one or more future communications resources.

25. The apparatus of claim 24, wherein the CSF report further indicates a delta value for at least one of the one or more future communications resources, the delta value along with the single value corresponding to the at least one of the one or more future communications resources.

26. The apparatus of claim 17, wherein the one or more future communications resources comprise one or more beams.

27. The apparatus of claim 26, wherein the indication comprises a configuration of a quasi-co-location (QCL) of a transmit beam of the network entity or a configuration of a receive beam of the UE to be used for predicting interference.

28. The apparatus of claim 17, wherein the one or more processors are configured to execute the instructions and cause the apparatus to:
receive, from the UE, a message indicating a recommended configuration of a quasi-co-location (QCL) of a transmit beam of the network entity or a configuration of a receive beam of the UE to be used for predicting interference.

29. A method for wireless communications at a user equipment (UE), comprising:
receiving, from a network entity, an indication to report at least one of a channel quality indicator (CQI) or a pre-coding matrix indicator (PMI) for one or more future communications resources, wherein the one or more future communications resources are within a maximum future number of resources, as per capability information of the UE, relative to transmission of the indication from the network entity for which the UE is capable of predicting the CQI or the PMI;
transmitting, to the network entity, a channel state feedback (CSF) report indicating at least one of a predicted CQI or a predicted PMI for the one or more future communications resources prior to the one or more future communications resources occurring in time; and
receiving, from the network entity, scheduling information scheduling the UE to communicate on at least one of the one or more future communications resources associated with a lower interference than other future communications resources based on the CSF report.

30. A method for wireless communications at a network entity, comprising:

transmitting, to a user equipment (UE), an indication to report at least one of a channel quality indicator (CQI) or a pre-coding matrix indicator (PMI) for one or more future communications resources, wherein the one or more future communications resources are within a maximum future number of resources, as per capability information of the UE, relative to transmission of the indication from the network entity for which the UE is capable of predicting the COI or the PMI;

receiving, from the UE, a channel state feedback (CSF) report indicating at least one of a predicted CQI or a predicted PMI for the one or more future communications resources prior to the one or more future communications resources occurring in time; and transmitting, to the UE, scheduling information scheduling the UE to communicate on at least one of the one or more future communications resources associated with a lower interference than other future communications resources based on the CSF report.

* * * * *